Oct. 10, 1950  E. B. DOOLIN  2,525,213
COOKING APPARATUS
Filed Aug. 23, 1945  2 Sheets-Sheet 1

INVENTOR.
EARL BERNARD DOOLIN
BY
Semmes Keegin Beale & Semmes
attorneys

Oct. 10, 1950   E. B. DOOLIN   2,525,213
COOKING APPARATUS
Filed Aug. 23, 1945   2 Sheets-Sheet 2

INVENTOR.
EARL BERNARD DOOLIN

Patented Oct. 10, 1950

2,525,213

UNITED STATES PATENT OFFICE 2,525,213

COOKING APPARATUS

Earl B. Doolin, Dallas, Tex., assignor to Freto Company, Dallas, Tex., a corporation of Texas Application August 23, 1945, Serial No. 612,191

5 Claims. (Cl. 126—299)

The present invention relates to cooking apparatus and more particularly to industrial apparatus employed in frying food products in hot oil or the like.

The apparatus such as usually is employed in the preparation of food products such as fried tortillas, potato chips and the like includes a vat for oil with a heating chamber thereunder provided with suitable heating means such as gas burners and a stack for carrying the products of combustion from the chamber into the outside atmosphere. In practice the raw or uncooked product is introduced into the vat of oil, conveyed therethrough at a rate designed to provide sufficient time to fry the product to desired condition and then removed at usual frying temperature (about 420° F.). During this operation, a considerable amount of oily fumes, smoke and steam arises from the cooking vat which is not only disagreeable to the attendant and customers but settles on the walls and ceiling of the cooking room and machinery, hardening into a gummy deposit which is difficult to remove.

Various attempts have been made to remedy this condition such as by placing a hood or canopy above the vat which is connected through a duct to an exhaust fan by means of which the fumes are withdrawn. This equipment has not proved entirely satisfactory because of faulty exhaust mechanisms, the dripping of condensed oil from the hood, and the difficulty of removing and cleaning such units.

It has also been proposed to discharge the fumes arising from the oil vat through the heating chamber stack. This method however causes frequent and sometimes serious stack fires from the heavier and slow burning fractions of the oil fumes. This latter method has the desirable feature of simplicity.

I have found that if means are provided to condense and trap a substantial portion of the oil residue from the fumes prior to reaching the stack carrying the products of combustion, the stack draft may be safely utilized for the removal of the fumes because the residual fumes which reach the stack before condensation are so light and volatile that they will burn immediately instead of forming dangerous accumulations.

This invention therefore has for one of its major objects the provision of a cooking apparatus of the type adapted to fry food products in a vat of hot oil or the like provided with a duct or flue means for oil fumes arising from the vat, said duct being separate from but having a connection with the stack carrying combustion gases from the apparatus to induce a flow through the duct, and said duct being so constructed and arranged that the oil residue of the fumes will be condensed therein prior to reaching the stack.

Another object of the invention is to provide a fume duct of the above character which is provided with means for collecting and removing the condensed oil residue.

Still another object of the invention is to provide a fume duct of this character which is easily removable from the cooking apparatus for cleaning.

Yet another object of the invention is to provide such a duct in combination with and cooperating with a hood or cover for the oil vat, the hood having openings adjacent one end thereof for introducing and removing the food products being cooked and the fume duct having its entrance connected with the opposite end of said hood whereby air flow induced by the stack draft will be caused to enter through said openings to move oil fumes in a direction away from said openings and prevent their escape therefrom.

A further object is to form at least a portion of the fume duct in the form of a V serving to retard or baffle the fume flow and increase the condensing effect of the duct, such V being provided with outlet and collection means for oil residue condensing therein.

A still further object of the invention is to provide a fume duct of the above character provided with supplementary internal baffle means for increasing the condensing area and effectiveness of the unit.

With these and other objects in view, which may be incident to my improvements, the invention consists in the parts and combinations to be hereinafter set forth and claimed, with the understanding that the several necessary elements comprising my invention may be varied in construction, proportions and arrangements, without departing from the spirit and scope of the appended claims.

In order to make my invention more clearly understood, I have shown in the accompanying drawings means for carrying the same into practical effect without limiting the improvements in their useful applications to the particular constructions which, for the purpose of explanation, have been made the subject of illustration.

Figure 1:
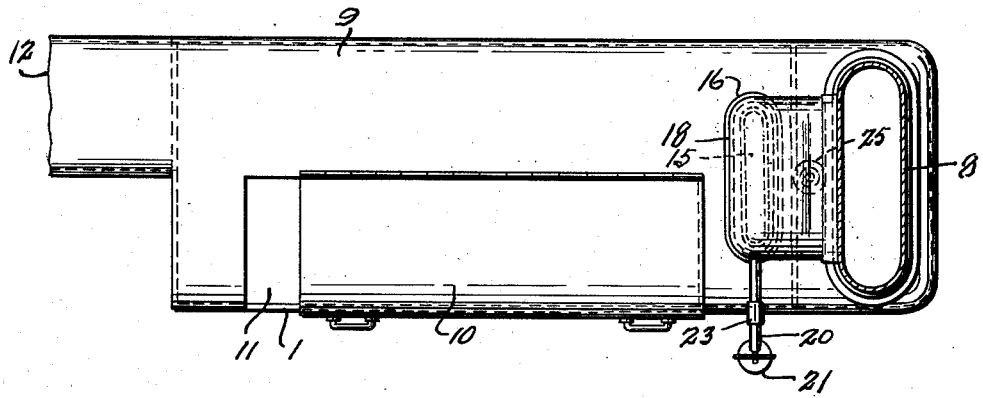
Figure 1 is a plan view of an industrial cooking apparatus such as is employed in deep frying food products and incorporating an oil fume duct or flue in accordance with the invention.
Figure 2:
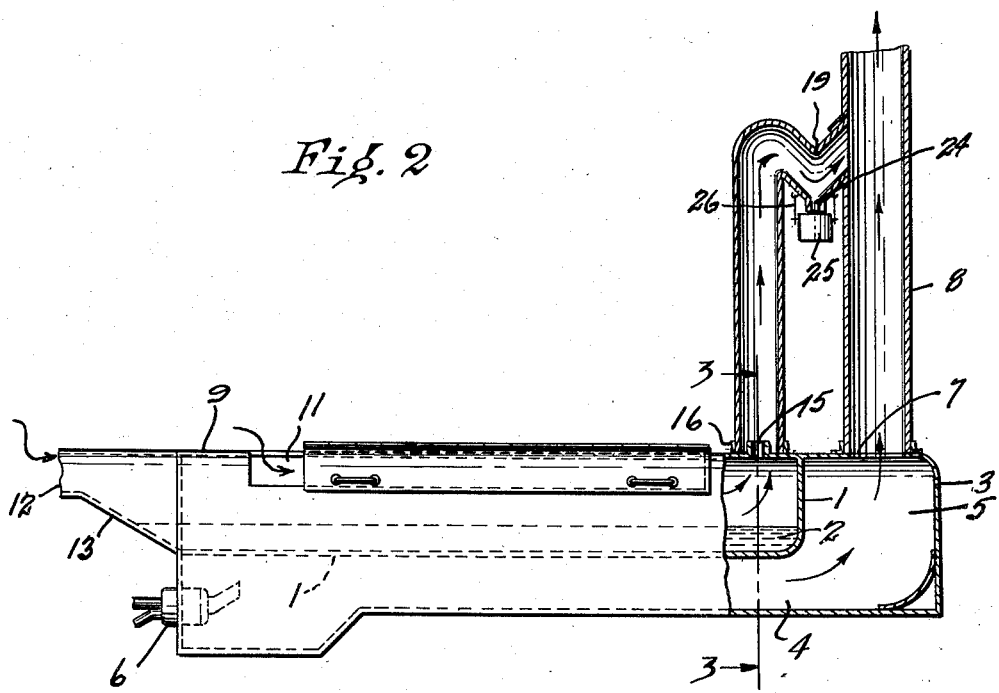
Figure 2 is a side elevational view partly in central longitudinal section of the unit illustrated in Figure 1.
Figure 3:
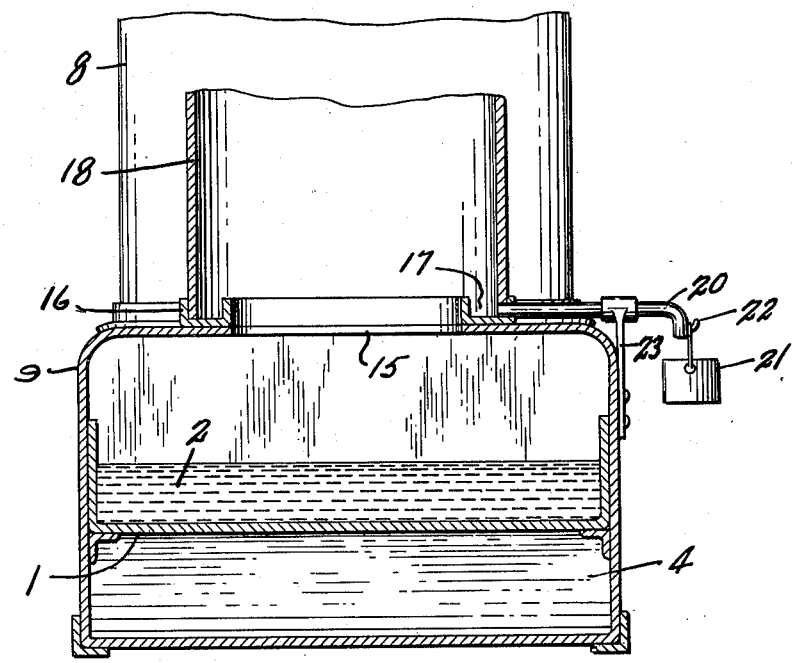
Figure 3 is a cross sectional view taken along the line 3—3 of Figure 2 looking in the direction of the arrows.
Figure 4:
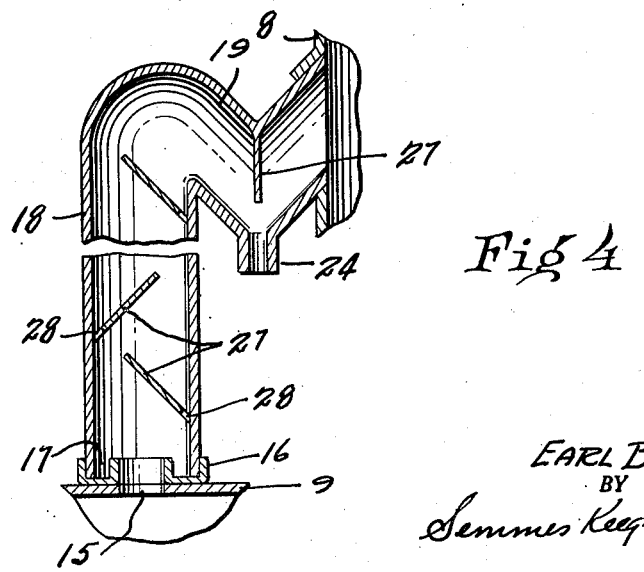
Figure 4 is a transverse sectional view of a fume duct incorporating internal baffles in accordance with a modified embodiment of the invention.

Referring more particularly to the drawings there is shown in Figures 1, 2 and 3 a cooking apparatus particularly adapted for the industrial frying of food products such as the fried tortillas described in Patent No. 2,002,053 to C. E. Doolin, and while the invention has particular reference to such apparatus, its use is not limited thereto as obviously the principle herein involved could be utilized with other types of cooking apparatus where cooking fumes constitute a problem. The specific apparatus disclosed comprises an elongated vat 1 constituting a reservoir for a supply of cooking oil or fat 2. Extending horizontally beneath the vat 1 and vertically upward along one end 3 thereof is an enclosed heating chamber 4 in the end opposite the vertical extension 5 of which is positioned a burner 6. The end wall of the heating chamber adjacent the burner may be provided with suitable draft regulating openings (not shown) while the opposite end, i. e., the top wall of the vertical extension 5, is an opening 7 which communicates with the entrance to a stack 8, preferably of substantially large and oval cross section, which is adapted to carry combustion gases from the heating chamber into the open atmosphere.

As a usual thing, the oil vat is open but according to one of the important features of this invention the vat 1 is completely enclosed, except as hereinafter provided, by a hood or cover 9. This hood has a hinged portion 10, hinged substantially along the longitudinal median line of the hood, and extends laterally to engage the side wall of the vat. It will be noted from Figures 1 and 2 that the hinged portion 10 is somewhat shorter than the opening which it covers to provide a space between the hinged and stationary portions of the hood which forms an opening 11, adjacent the end of the vat away from the stack 8, for introducing the products to be cooked into the vat. A second opening 12, also adjacent the end of the vat removed from the stack 8 is provided for removing cooked products from the vat. This latter opening may include an upwardly inclined chute 13.

Usually in the above type of apparatus conveying mechanism is employed for conveying the products from the input opening 11, through the vat to the far end and thence back and out through the discharge opening 12. This conveyor is usually timed so that one circuit through the vat of hot oil completely cooks the product. The conveyor, however, forms no part of the present invention and is not illustrated in the drawings.

The unhinged portion of the cover 9, adjacent the stack 8, is provided with an aperture 15, the periphery of which is encircled by a circular channel member 16 which forms a trough 17. The lower end of a conduit 18 is removably fitted within this trough in close contact with the outer flange.

The conduit 18 extends vertically upwardly in substantially parallel relation to the stack 8 and its upper portion is bent downwardly and then upwardly to form a V-shaped elbow 19 which has a removable connection with the stack 8 through an aperture. The draft in the stack 8 thus induces a flow of air through the openings 11 and 12, the hood 9, conduit 18 and into the stack 8 and serves as the means for removing the undesirable fumes which arise from the heated oil in the vat 1.

A portion of these fumes will be condensed on the inner surface of the vertical portion of the conduit 18 during flow therethrough and this condensate flows down this surface into the trough 17. A pipe 20 is provided to empty the liquid collected in the trough into a receptacle 21 which is removably supported by a hook 22 carried by the outer end of the pipe 20. The pipe 20 may be supported by a bracket 23 and communicates with the trough through an aperture in the outer flange of the channel member 16 and an aligned notch in the lower end of the conduit 18.

The remaining portions of the heavier fractions of the oil fumes will be condensed in the V-shaped elbow 19 the shape of which serves as a baffle to retard the ascending oil fumes and thereby affords additional time for adequate condensation. The lower portion of the elbow is drained by an outlet duct 24 beneath which is removably suspended a receptacle 25 by an arrangement of hooks and connecting links 26. The condensate in the elbow is collected in this receptacle which can be emptied when necessary.

Under certain conditions additional condensing surface in the conduit 18 may be desirable in which case a series of staggered baffles 27 such as shown in Figure 3 may be mounted in the conduit 18 which not only retard the passage of oil fumes into the stack 8 but provide a substantial surface upon which the condensate may form. This structure is desirable especially if the stock construction gives rise to an excessive draft in the conduit 18. Preferably the baffles 27 in the vertical section of the conduit 18 slope upwardly from the conduit wall and are provided with openings 28 adjacent the wall of the conduit through which any condensate formed on the upper faces of the baffle may flow.

By virtue of the above arrangement wherein the conduit 18 is positioned at the opposite end of the hood from the openings 11 and 12, the fumes from the oil are moved in a direction away from these openings thus precluding their escape into the cooking room. Some of the condensate in the conduit 18 will adhere to its wall and should periodically be removed. By means of this construction the conduit may easily be removed by lifting its lower end out of the channel 16 and then withdrawing the upper end from the stack. The residue in the conduit may then be cleaned out by suitable means.

It is believed obvious that the described improvement in industrial apparatus for frying food products in hot oil or the like is a distinct advance in the art of removing objectionable fumes from the heated oil. While for purposes of illustration a particular type of cooking apparatus and stack construction has been described, it is to be understood that the invention can be adapted for removing these fumes from other types of cooking apparatus by one skilled in the art without departing from the present invention.

I claim:

1. An apparatus for cooking food products in heated oil and the like comprising a covered vat for the oil having an aperture above the oil level, heating means operatively associated with the vat, a flue for removing the products of combustion from the heating means, a conduit connecting the vat with the flue through said aperture to remove fumes from the vat rising from the heated oil, said conduit having an inner wall upon which condensate from the said fumes may deposit, a trough within the conduit at the bottom thereof adjacent said wall and surrounding said aperture to collect condensate draining from said wall, a pipe communicating with the trough to remove condensate therefrom, and a receptacle positioned at the outer end of the pipe to collect the condensate.

2. An apparatus for cooking food products in heated oil or the like comprising a covered vat for the oil, openings at one end of the vat for the introduction and removal of food products and an aperture at the opposite end of the vat positioned above the oil level, heating means operatively associated with the vat, a flue for removing the products of combustion from said heating means, a conduit communicating with the vat through the said aperture and connecting the vat with the flue to remove fumes from the vat arising from the heated oil, said conduit having an inner wall upon which condensate from the oil fumes may deposit, and a trough within the conduit adjacent the bottom thereof and adjacent said wall to collect condensate draining from said wall.

3. An apparatus for cooking food products in heated oil or the like comprising a covered vat for the oil, openings at one end of the vat for the introduction and removal of food products and an aperture at the opposite end of the vat positioned above the oil level, heating means operatively associated with the vat, a flue for removing the products of combustion from said heating means, a conduit communicating with the vat through the said aperture and connecting the vat with the flue to remove fumes from the vat arising from the heated oil, said conduit having a straight vertical lower portion extending upwardly in parallel relation to the stack and an upper portion bent to form a downwardly pointing V-shaped elbow which communicates with the stack, said conduit having an inner wall upon which condensate from the oil fumes may deposit, means to collect the condensate at the bottom of the conduit and at the lower end of the V-shaped elbow, and drain means communicating with the elbow and lower portion of the conduit to remove the collected condensate.

4. An apparatus for cooking food products in heated oil or the like comprising a covered vat for the oil, openings at one end of the vat for the introduction and removal of food products and an aperture at the opposite end of the vat positioned above the oil level, heating means operatively associated with the vat, a flue for removing the products of combustion from said heating means, a conduit communicating with the vat through the said aperture and connecting the vat with the flue to remove fumes from the vat arising from the heated oil, said conduit having a straight vertical lower portion extending upwardly in parallel relation to the stack and an upper portion bent to form a downwardly pointing V-shaped elbow which communicates with the stack, said conduit having an inner wall upon which condensate from the oil fumes may deposit, a trough positioned at the bottom of the straight portion of the conduit within the same adjacent said wall to collect condensate formed in that portion of the conduit, a pipe to remove the condensate from the trough, a receptacle supported by the outer end of the pipe to collect the condensate, a discharge outlet communicating with the lower portion of the V-shaped elbow to remove the condensate formed in the upper portion of the conduit, and a receptacle supported adjacent the discharge outlet to collect the condensate therefrom.

5. An apparatus for cooking food products in heated oil or the like comprising a covered vat for the oil, openings at one end of the vat for the introduction and removal of food products and an aperture at the opposite end of the vat positioned above the oil level, heating means operatively associated with the vat, a flue for removing the products of combustion from said heating means, a conduit communicating with the vat through the said aperture and connecting the vat with the flue to remove fumes from the vat arising from the heated oil, said conduit having an inner wall upon which condensate from the oil fumes may deposit, a plurality of baffles mounted within the conduit to retard the passage of the fumes and assist in the condensation of the fumes, and a trough within the conduit at the bottom thereof adjacent said wall and surrounding said aperture to collect condensate draining from said wall.

EARL B. DOOLIN.

REFERENCES CITED

The following references are of record in the file of this patent:

UNITED STATES PATENTS

| Number | Name | Date |
|---|---|---|
| 1,375,548 | Barnes | Apr. 19, 1921 |
| 2,002,053 | Doolin | May 21, 1935 |
| 2,081,640 | Petersen | May 25, 1937 |
| 2,392,038 | Gaylord | Jan. 1, 1946 |
| 2,393,957 | Baumgartner | Feb. 5, 1946 |

FOREIGN PATENTS

| Number | Country | Date |
|---|---|---|
| 370,159 | Great Britain | Apr. 7, 1932 |
| 370,160 | Great Britain | Apr. 7, 1932 |
| 600,069 | France | June 25, 1925 |

Certificate of Correction

Patent No. 2,525,213      October 10, 1950

EARL B. DOOLIN

It is hereby certified that the name of the assignee in the above numbered patent was erroneously described and specified as "Freto Company" whereas said name should have been described and specified as *Frito Company*, and that the said Letters Patent should be read as corrected above, so that the same may conform to the record of the case in the Patent Office.

Signed and sealed this 26th day of December, A. D. 1950.

[SEAL]

THOMAS F. MURPHY,
*Assistant Commissioner of Patents.*